US012666178B2

(12) United States Patent
Li et al.

(10) Patent No.: US 12,666,178 B2
(45) Date of Patent: Jun. 23, 2026

(54) SEAFLOOR OBSERVATION NETWORK-BASED SUBSURFACE BUOY DEVICE WITH REAL-TIME POWER SUPPLYING AND HIGH-SPEED DATA TRANSMITTING

(71) Applicant: Institute of Acoustics, Chinese Academy of Sciences, Beijing (CN)

(72) Inventors: Fenghua Li, Beijing (CN); Yuankai Zhang, Beijing (CN); Yonggang Guo, Beijing (CN); Jing Du, Beijing (CN); Yongguo Chang, Beijing (CN); Yong Qiu, Beijing (CN); Lei Zhang, Beijing (CN); Jie Yang, Beijing (CN); Wei Jiang, Beijing (CN); Sujing Wang, Beijing (CN)

(73) Assignee: Institute of Acoustics, Chinese Academy of Sciences, Beijing (CN)

( * ) Notice: Subject to any disclaimer, the term of this patent is extended or adjusted under 35 U.S.C. 154(b) by 256 days.

(21) Appl. No.: 18/686,164

(22) PCT Filed: Aug. 18, 2022

(86) PCT No.: PCT/CN2022/113341
§ 371 (c)(1),
(2) Date: Feb. 23, 2024

(87) PCT Pub. No.: WO2023/025034
PCT Pub. Date: Mar. 2, 2023

(65) Prior Publication Data
US 2024/0357265 A1 Oct. 24, 2024

(30) Foreign Application Priority Data
Aug. 26, 2021 (CN) .......................... 202110986509.8

(51) Int. Cl.
*H04Q 1/28* (2006.01)
*B63B 22/00* (2006.01)
(Continued)

(52) U.S. Cl.
CPC ............... *H04Q 1/28* (2013.01); *B63B 22/04* (2013.01); *H04B 11/00* (2013.01); *H04B 13/02* (2013.01);
(Continued)

(58) Field of Classification Search
CPC .. H04Q 2209/88; H04Q 2209/84; H04Q 1/28; H04B 11/00; H04B 13/02; B63B 22/04; H04L 1/22
(Continued)

(56) References Cited

U.S. PATENT DOCUMENTS 3,299,398 A * 1/1967 Hersey ..................... G01V 1/38
441/12
2017/0347169 A1* 11/2017 Chun ....................... H04Q 9/00

FOREIGN PATENT DOCUMENTS

CN 106516051 A * 3/2017 ............. G01C 13/00
CN 107024244 A 8/2017
(Continued)

OTHER PUBLICATIONS

Wang et al. ("A data management method for remote and long-term seafloor observation system." Marine Geodesy 43.1 (2020): 1-22, "Wang") (Year: 2020).*
(Continued)

*Primary Examiner* — Yuqing Xiao
*Assistant Examiner* — Christopher Richard Walker
(74) *Attorney, Agent, or Firm* — Flener IP & Business Law

(57) ABSTRACT
A seafloor observation network-based subsurface buoy device with real-time power supplying and high-speed data
(Continued)

transmitting is provided. The subsurface buoy device includes a seabed base deployed on the seafloor and a vertical mooring system connected to a bottom surface of the seabed base to extend to the sea surface. The seabed base serves as a gravity anchor to enable the subsurface buoy device to be positioned stably at a layout site, and is further used for obtaining power supply of the subsurface buoy device from a junction box of a seafloor observation network. The seabed base also sends the management and control commands from the junction box to the vertical mooring system, and transmits the data collected by the vertical mooring system back to the junction box in real time.

8 Claims, 2 Drawing Sheets

(51) Int. Cl.
| | |
|---|---|
| *B63B 22/04* | (2006.01) |
| *H04B 11/00* | (2006.01) |
| *H04B 13/02* | (2006.01) |
| *H04Q 9/00* | (2006.01) |

(52) U.S. Cl.
CPC .......... *H04Q 9/00* (2013.01); *B63B 2022/006* (2013.01); *H04Q 2209/88* (2013.01)

(58) Field of Classification Search
USPC .......................................................... 367/3
See application file for complete search history.

(56) References Cited

FOREIGN PATENT DOCUMENTS

| | | | | | |
|---|---|---|---|---|---|
| CN | 110712719 | A | * | 1/2020 | ............. B63B 21/29 |
| CN | 110510068 | B | * | 8/2020 | ............. B63B 22/04 |
| CN | 113060245 | A | | 7/2021 | |
| CN | 113709597 | A | | 11/2021 | |
| WO | WO-2015194062 | A1 | * | 12/2015 | ............. B63B 22/06 |
| WO | 2023025034 | A1 | | 2/2023 | |

OTHER PUBLICATIONS

Xu et al. ("Sea trial of a real-time submerged buoy communication system based on wireless networking." Proceedings of the International Conference on Artificial Intelligence, Information Processing and Cloud Computing. 2019., "Xu") (Year: 2019).*

Frye et al. ("An acoustically linked moored-buoy ocean observatory." Eos, Transactions American Geophysical Union 87.22 (2006): 213-218., "Frye") (Year: 2006).*

CN 110712719 A (machine translation) (Year: 2020).*

CN 110510068 B (machine translation) (Year: 2020).*

CN 106516051 A (machine translation) (Year: 2017).*

WO 2015194062 A1 (machine translation) (Year: 2015).*

International Search Report for PCT/CN2022/113341; issued Oct. 20, 2022.

* cited by examiner

Sea surface

SEAFLOOR OBSERVATION NETWORK-BASED SUBSURFACE BUOY DEVICE WITH REAL-TIME POWER SUPPLYING AND HIGH-SPEED DATA TRANSMITTING

CROSS-REFERENCE TO RELATED APPLICATION

This application is a national stage application under 35 U.S.C. 371 and claims priority to Chinese Patent Application No. 2021109865098, filed on Aug. 26, 2021, and entitled "SEAFLOOR OBSERVATION NETWORK-BASED SUBSURFACE BUOY DEVICE WITH REAL-TIME POWER SUPPLYING AND HIGH-SPEED DATA TRANSMITTING", which is incorporated herein by reference in its entirety.

TECHNICAL FIELD

The present invention relates to the field of marine observation technologies, and in particular, to a seafloor observation network-based subsurface buoy device with real-time power supplying and high-speed data transmitting.

BACKGROUND

Oceanography is a science based on observation. Oceanographic information is distributed on a water surface, in a water body, and at a water bottom. Water surface (including a surface layer of a water body) information may be obtained through satellite remote sensing and buoys. Water bottom information may be obtained through a seabed base. Observation of a water body including the most abundant marine information is generally implemented by using a subsurface buoy system with a vertical mooring system, which obtains data by arranging observation devices at different depths, and has advantages such as a wide range of observation depths, a long observation time, relatively stable observation data, and a concealed observation method.

There are generally several types of conventional subsurface buoy systems as follows:

(1) Self-contained subsurface buoy: A main floating body of the subsurface buoy is disposed at a particular depth underwater. Observation data is stored in the subsurface buoy, and the subsurface buoy needs to be recovered before the observation data can be obtained. In this case, working duration is limited, and timeliness of data is poor. Once the subsurface buoy is damaged, all collected data may be lost.

(2) Inductively coupled quasi-real-time subsurface buoy: Data of observation devices on a vertical mooring system is aggregated by using an inductively coupled technology, and then communication floats, underwater winches or timing buoys are used to perform quasi-real-time communication from a sea surface to satellites, or are connected to a seafloor observation network through a seabed base platform for quasi-real-time communication, which improves the timeliness of the subsurface buoy observation to a certain extent. The power supply of the observation devices in the solution can only rely on batteries carried in the observation devices. The problem of real-time power supply still cannot be effectively solved. Due to energy constraints, all kinds of observation devices carried in the solution cannot carry out long-term continuous sampling at a high sampling rate. In addition, a bandwidth of an inductive coupling method is limited, and transmission efficiency is relatively low.

The above two types of subsurface buoys have the disadvantages of limited power supply and inability to long-term intensive sampling, resulting in the inability to observe ocean turbulence, internal waves, and other fast phenomena. The seafloor observation network uses optical cables to build high-power power supply and high-speed communication networks, and realizes long-term and stable power supply and high-bandwidth communication for underwater observation devices through connection ports of junction boxes, making it possible to invent a subsurface buoy based on real-time power supply and high-speed data transmission of a seafloor observation network.

Patent Application 201910928527.3 discloses a seafloor observation network-based real-time transmission subsurface buoy system. The system only resolves the technical problem of how to accurately connect a subsurface buoy system to a seafloor observation network, and there is no introduction to how to provide power supply and communication to observation devices.

SUMMARY

An objective of the present invention is to overcome the deficiencies in the prior art, and provides a seafloor observation network-based subsurface buoy device with real-time power supplying and high-speed data transmitting. The device may obtain long-term stable supply of electrical energy and a communication capability with a high transmission bandwidth through connection ports of a seafloor observation network, to meet scientific requirements of long-term, real-time, and high-resolution observation of marine water body parameters.

The present invention provides a seafloor observation network-based subsurface buoy device with real-time power supplying and high-speed data transmitting. The subsurface buoy device includes a seabed base deployed on a seabed and a vertical mooring system connected to a bottom surface of the seabed base to extend to a sea surface, where the seabed base is used for providing a function of a gravity anchor, to enable the subsurface buoy device to be stably positioned at a layout site, and is further used for obtaining supply of electrical energy of the subsurface buoy device from a junction box of a seafloor observation network, sending, to the vertical mooring system, a management and control command sent by the junction box of the seafloor observation network, and transmitting data collected by the vertical mooring system to the junction box of the seafloor observation network in real time; and the vertical mooring system adopts a structure that an overall force bearing rope is combined with a segmented main cable, and is used for transmitting the electrical energy obtained from the seabed base to each sensor arranged on the force bearing rope, and sending, to the seabed base, data of the sensors at different water depths according to the management and control command transmitted by the seabed base.

As an improvement to the foregoing device, a first gathering cabin is disposed in the seabed base, the first gathering cabin is connected to a connection port of the junction box of the seafloor observation network by a wet pluggable connector, and the first gathering cabin includes a power adapter and a protocol adapter, where the power adapter is used for converting high-voltage power provided by the junction box of the seafloor observation network into medium-voltage power and sending the medium-voltage power to a power cable of the main cable of the vertical mooring system; and the protocol adapter is used for converting the management and control command sent by the junction box of the seafloor observation network into a protocol format and sending the command in the protocol format to a data bus of the main cable, and is further used for gathering the data of the sensors collected by the vertical mooring system at different water depths, converting the data into a communication protocol format suitable for the junction box of the seafloor observation network, and sending the data in the communication protocol format to the junction box of the seafloor observation network, where a format of the data bus includes, but not limited to, a CAN field bus and an RS485 field bus.

As an improvement to the foregoing device, a positioning beacon and a main floating body are sequentially disposed from a top end to bottom in the vertical mooring system, where the positioning beacon is used for emitting positioning information when the subsurface buoy device rises to the sea surface, which is convenient for fishing; and the main floating body is used for stretching the vertical mooring system through buoyancy.

As an improvement to the foregoing device, a second gathering cabin and an underwater acoustic communication machine are disposed in the main floating body, the second gathering cabin is used for monitoring a periodic instruction sent by a first gathering cabin, and when the periodic instruction can be received, the second gathering cabin is in a slave state; and when the periodic instruction cannot be received, the second gathering cabin is in a master state, the data of the sensors collected by the vertical mooring system at different water depths is obtained through a data bus of the main cable, the data is converted into a format required for the underwater acoustic communication machine, and the data in the format is sent by the underwater acoustic communication machine to the underwater acoustic communication machine in the junction box of the seafloor observation network.

As an improvement to the foregoing device, an access cabin, a relay cabin, and a sensor are disposed in the vertical mooring system, where one or two or more access cabins are provided, are fastened to the force bearing rope by a clamp, are separately connected to the first gathering cabin and the second gathering cabin by the main cable, and are connected to the sensor by an access cable; and the relay cabin is used for enhancing a transmitted signal when a transmission distance of the main cable is insufficient because a length of the main cable is excessively long or a quantity of accessed sensors is excessively large; and the relay cabin is located between two access cabins, or between the access cabin and the first gathering cabin, or between the access cabin and the second gathering cabin, and an upper end and a lower end of the relay cabin are both connected to the main cable, and are fastened to the force bearing rope by the clamp.

As an improvement to the foregoing device, the access cabin includes a power adapter and a protocol adapter, where the power adapter is used for converting medium-voltage power of a power cable of the main cable into low-voltage power to supply power to the sensor; and the protocol adapter is used for converting the management and control command from a communication protocol format on the data bus of the main cable into a communication protocol format suitable for the sensor, and is further used for converting data collected by the sensor into a protocol format required for the data bus of the main cable, and sending the data in the protocol format to the data bus of the main cable.

As an improvement to the foregoing device, the relay cabin includes a power adapter and a signal regenerator, where the power adapter is used for converting medium-voltage power of a power cable of the main cable into low-voltage power to supply power to the signal regenerator; and the signal regenerator is used for performing signal enhancement on bidirectional data of the data bus of the main cable.

As an improvement to the foregoing device, one bearing conductive swivel is separately disposed between the main floating body and the vertical mooring system and between the vertical mooring system and the seabed base, and is used for eliminating torque of the vertical mooring system.

As an improvement to the foregoing device, a floating block is wrapped outside the access cabin, the relay cabin, and the sensor, and used for adjusting a weight in water of the vertical mooring system to zero.

As an improvement to the foregoing device, the length of the main cable is slightly greater than that of the force bearing rope, and the main cable is fastened to the force bearing rope by a cable clamp, to keep the main cable from damage caused by a force and at the same time keep the main cable and the force bearing rope from being twisted to each other.

Compared with the prior art, the advantages of the present invention are as follows:

1. In the present invention, through stable power supply and a high-speed data interface provided by the seafloor observation network, a mode that long-term high-speed collection cannot be achieved due to the fact that a sensor of a traditional subsurface buoy can only depend on a battery of the sensor for supplying power is changed, the sensors are connected by the gathering cabins, the access cabin, and the main cable and are connected to the seabed base, so that the sensors may obtain continuous and stable power supply from the junction box of the seafloor observation network, the sensors may operate in a highest performance mode, and collected data is transmitted back in real time at a high speed through the seafloor observation network, to realize long-term high-resolution observation of marine water body parameters.

2. The main cable of the present invention is segmented. When a segment of the main cable is damaged, only the damaged segment of the main cable needs to be replaced, to improve the maintainability of the subsurface buoy device and reduce manufacturing difficulty of the main cable.

3. In the present invention, the second gathering cabin is disposed at an upper end of the subsurface buoy device for use as a backup underwater acoustic transmission channel, so that when a transmission fault occurs in the relay cabin or the first gathering cabin of the vertical mooring system, data of the sensors may be transmitted back to the junction box through the underwater acoustic communication machine.

DESCRIPTION OF EMBODIMENTS

The technical solutions of the present invention are described below in detail with reference to the accompanying drawings and the embodiments.

Embodiment 1

Figure 1:
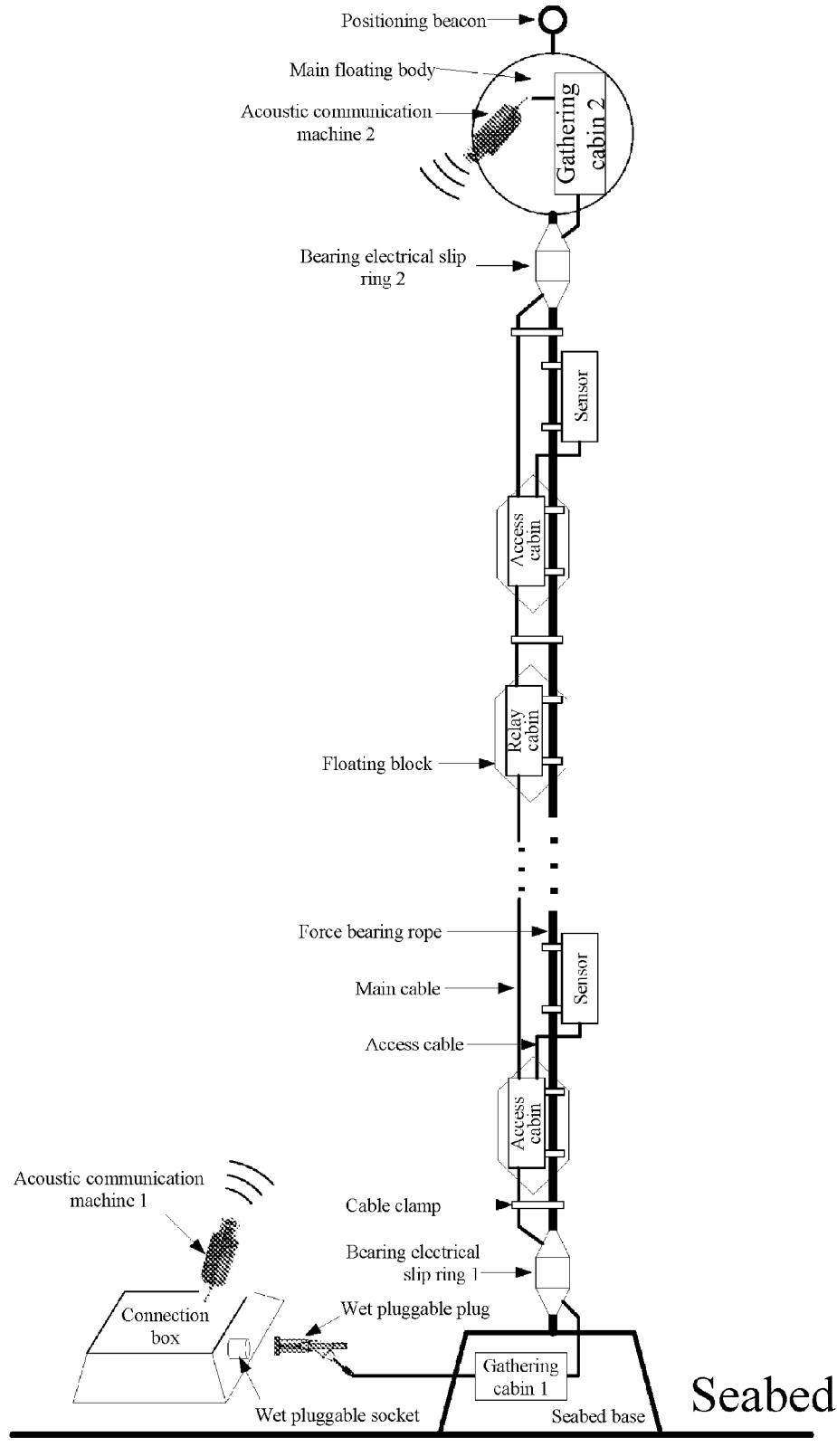
FIG. 1 is a composition diagram of a seafloor observation network-based subsurface buoy device with real-time power supplying and high-speed data transmitting according to the present invention.

As shown in FIG. 1, Embodiment 1 of the present invention provides a seafloor observation network-based subsurface buoy device with real-time power supplying and high-speed data transmitting.

The device is formed by a seabed base and a vertical mooring system. Gathering cabins, access cabins, relay cabins, and main cables between the cabins are used to form a backbone line. The functions of the components are as follows.

Figure 2:
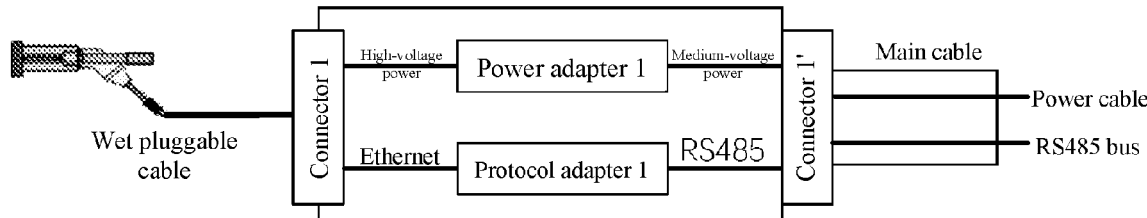
FIG. 2 is a composition diagram of a first gathering cabin of a subsurface buoy device according to the present invention.

(1) The composition of a first gathering cabin (that is, a gathering cabin 1 in FIG. 1) is shown in FIG. 2. The first gathering cabin is located at the seabed base, and is connected to a connection port of a junction box of a seafloor observation network by a wet pluggable connector. A protocol adapter 1 serves as a master to communicate with a plurality of slaves (sensors), to realize delivery of a management and control command of the junction box and gathering and uploading of data of the sensors.

Figure 5:
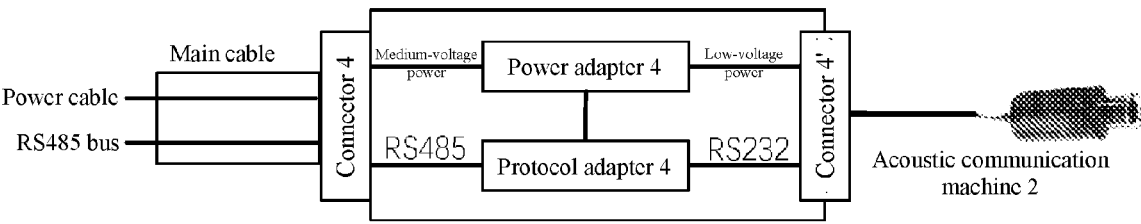
FIG. 5 is a composition diagram of a second gathering cabin of a subsurface buoy device according to the present invention.

(2) The composition of a second gathering cabin (that is, a gathering cabin 2 in FIG. 1) is shown in FIG. 5. The second gathering cabin is located in a main floating body at a top end of the vertical mooring system, is connected to the main cable by a connector 4, and may transmit data to an underwater acoustic communication machine 1 on the junction box in a manner of underwater acoustic wireless communication. The second gathering cabin monitors a periodic instruction sent by the first gathering cabin to determine whether a communication link between the second gathering cabin and the periodic instructions sent by the first gathering cabin is normal. If the second gathering cabin can receive the periodic instructions sent by the first gathering cabin, it indicates that the communication link between the second gathering cabin and the first gathering cabin is normal, and the second gathering cabin remains in a slave state and has no communication action. Otherwise, it indicates that the communication link between the second gathering cabin and the first gathering cabin is abnormal, the second gathering cabin is switched to a master state, to obtain data from the sensors on the vertical mooring system and establish a communication link with the junction box by using the underwater acoustic communication machine 1 to realize redundancy of a data transmission path.

Figure 3:
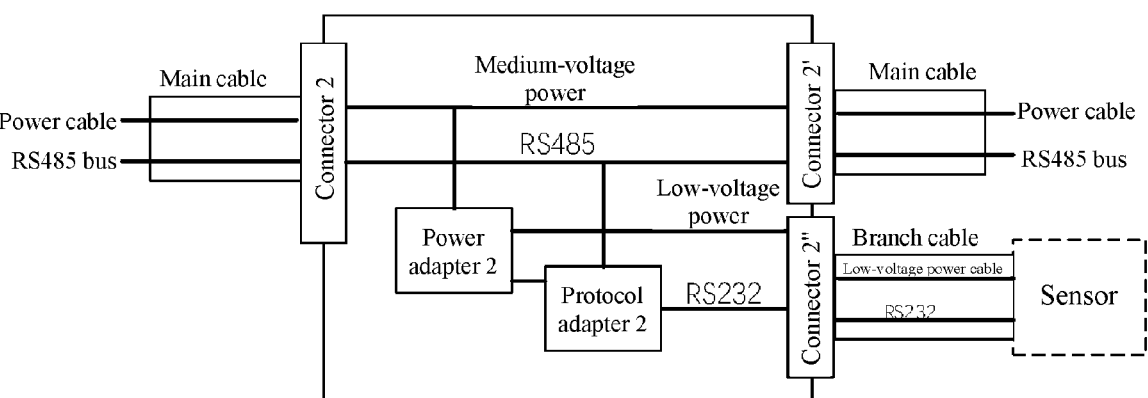
FIG. 3 is a composition diagram of an access cabin of a subsurface buoy device according to the present invention.

(3) The composition of the access cabin is shown in FIG. 3. The access cabin is located at the vertical mooring system. One or more access cabins are provided, and are fastened to the force bearing rope by a clamp. The access cabin may be alternatively arranged in the seabed base, is connected to the first gathering cabin and the second gathering cabin by the main cable, and is connected to the sensor by an access cable.

Figure 4:
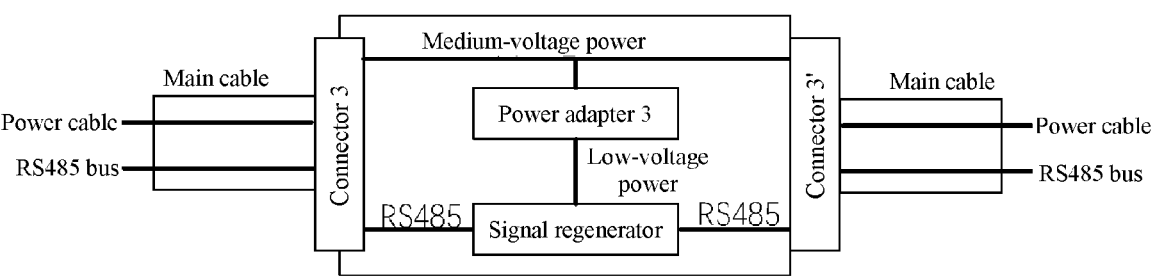
FIG. 4 is a composition diagram of a relay cabin of a subsurface buoy device according to the present invention.

(4) When a transmission distance of the main cable is insufficient because a length of the main cable is excessively long or the quantity of accessed sensors is excessively large, the relay cabin is used to complete restoration and regeneration of a signal, so that a communication distance can be further increased, to improve communication quality. The composition of the relay cabin is shown in FIG. 4. Two ends of the relay cabin are connected to the main cable, are located between two access cabins or between the access cabin and the gathering cabin, and are fastened to the force bearing rope by a clamp.

(5) The seabed base also has a function of a gravity anchor, to enable the subsurface buoy device to be stably positioned at a layout site, so that the subsurface buoy device is kept from being moved by a sea current, to avoid damage or detachment of a connection cable of the junction box.

(6) The main floating body is located at an upper end of the subsurface buoy device, and stretches the vertical mooring system through large buoyancy, to enable the sensors to operate at set water depths.

(7) A positioning beacon is located at a top end of the subsurface buoy device, and may emit positioning information during recovery of the subsurface buoy device or when the subsurface buoy device accidentally rises to a sea surface, to facilitate recovery.

(8) The subsurface buoy device is affected by sea current in seawater, and the main floating body and the anchor system of the subsurface buoy device tend to twist. For this reason, a bearing conductive swivel is used to realize connection between the main floating body, the seabed base, and the mooring system, so that torque of the mooring system can be eliminated.

(9) To reduce a gravity of the vertical mooring system in seawater and reduce operating tension of the force bearing rope and the bearing conductive swivel, a floating block is wrapped outside the access cabin, the relay cabin, and even the sensors, so that the weight in water of the vertical mooring system can be adjusted to zero, and the each cabins are fastened to the force bearing rope by clamps.

The length of the main cable is slightly greater than that of the force bearing rope, and the main cable is fastened to the force bearing rope by a cable clamp, to keep the main cable from damage caused by a force and at the same time keep the main cable and the force bearing rope from being twisted to each other.

It is defined that a direction from the junction box to the second gathering cabin is a downlink direction, and the opposite direction is an uplink direction.

It needs to be noted that in this embodiment and FIG. 2 to FIG. 5, an RS485 field bus is used as an example for a data bus protocol of the main cable, or another protocol like a CAN protocol may be used. RS232 is used as an example for a data format of the access cable, or another protocol like RS485 may be used.

(1) A downlink instruction (which usually is an Ethernet protocol, but is not limited to an Ethernet protocol) sent by the junction box and downlink high-voltage power enters the first gathering cabin through a wet pluggable cable and a connector 1. The downlink instruction from the junction box is converted by the protocol adapter 1 into an RS485 interface format, and enters an RS485 bus in the main cable through a connector 1'. The downlink high-voltage power from the junction box is converted by a power adapter 1 into medium-voltage power, and the medium-voltage power enters a power cable in the main cable through the connector 1'. A high voltage is usually approximately 375 V, and is an output from an observation network junction box. A medium voltage is usually 100 V approximately, and is used for reducing a voltage-resistance indicator of the main cable.

(2) The high-voltage power sent by the first gathering cabin enters the access cabin along the power cable in the main cable through a connector 2, and is converted by a power adapter 2 into low-voltage power. As required by the sensors, the low-voltage power is usually approximately 24 V, or may be 12 V to 48 V. The low-voltage power enters the sensors through the connector 2" along a low-voltage power cable in a branch cable to supply power to the sensors.

(3) The downlink instruction on the RS485 bus enters the access cabin along the RS485 bus in the main cable through the connector 2, and is converted by a protocol adapter 2 into an RS232 protocol suitable for sensor communication, and enters the sensors through the connector 2" along an RS232 communication cable in the branch cable. The sensors receive and identify whether the downlink instruction is a local communication instruction, and if yes, provide response data, or if not, ignore the downlink instruction.

(4) The downlink high-voltage power and an RS485 downlink instruction are transmitted to all the access cabins along the main cable. The first gathering cabin communicates with a sensor connected to only one access cabin at a same moment, to avoid conflict during communication with a plurality of sensors.

(5) Uplink response data sent by a sensor enters the access cabin along the RS232 communication cable in the branch cable through the connector 2", and is converted by the protocol adapter 2 into RS485 format. The data in the RS485 format enters the RS485 bus in the main cable through the connector 2, enters the first gathering cabin through the connector 1', and is converted by the protocol adapter 1 into an Ethernet protocol. The data of the Ethernet protocol enters the junction box through the connector 1 along the wet pluggable cable, to complete data interaction.

(6) The relay cabin may be located at any position of the vertical mooring system. 1). The medium-voltage power in the main cable passes through the relay cabin through a connector 3 and a connector 3' and at the same time is converted by a power adapter 3 inside the relay cabin into low-voltage power to supply power to a signal regenerator. 2) The RS485 bus in the main cable enters the relay cabin through the connector 3, and is connected to the main cable by the connector 3' after signal enhancement by the signal regenerator. Because the RS485 bus allows bidirectional transmission, the foregoing process may also be input into the connector 3' and output from the connector 3.

The medium-voltage power obtained by the second gathering cabin from the power cable of the main cable is converted by a power adapter 4 into low-voltage power to supply power to a protocol adapter 4, and supply power to underwater acoustic communication machines through a connector 4'. When the communication link between the first gathering cabin and the second gathering cabin is normal, a protocol adapter of the second gathering cabin remains in a slave state and has no action. When failing to detect the periodic instruction sent by the first gathering cabin, the second gathering cabin switches its state to a master state, obtains the data of the sensors on the vertical mooring system through the RS485 bus in the main cable, converts the data into RS232, is connected to an underwater acoustic communication machine 2 through the connector 4', and establishes communication with the underwater acoustic communication machine 1 on the junction box through an underwater acoustic channel, to realize path redundancy.

Finally, it should be noted that the foregoing embodiments are merely intended for describing the technical solutions of the present invention rather than limiting the present invention. Although the present invention is described in detail with reference to the embodiments, persons of ordinary skill in the art should understand that they may still make modifications or equivalent replacements to the technical features of the present invention without departing from the spirit and scope of the technical solutions of the technical solutions of the present invention. These modifications or equivalent replacements shall all fall within the scope of the claims the present invention.

We claim:

1. A seafloor observation network-based subsurface buoy device with real-time power supplying and high-speed data transmitting, wherein the subsurface buoy device comprises a seabed base deployed on a seabed and a vertical mooring system connected to a bottom surface of the seabed base to extend to a sea surface, wherein the seabed base is used for providing a function of a gravity anchor, to enable the subsurface buoy device to be stably positioned at a layout site, and is further used for obtaining electrical energy from a junction box of a seafloor observation network, sending, to the vertical mooring system, a management and control command sent by the junction box of the seafloor observation network, and transmitting data collected by the vertical mooring system to the junction box of the seafloor observation network in real time; and the vertical mooring system adopts a structure that an overall force bearing rope is combined with a segmented main cable, and is used for transmitting the electrical energy obtained from the seabed base to each sensor arranged on the force bearing rope, and sending, to the seabed base, data of the sensors at different water depths according to the management and control command transmitted by the seabed base;

wherein a positioning beacon and a main floating body are sequentially disposed from a top end to bottom in the vertical mooring system, wherein the main floating body is used for stretching the vertical mooring system through buoyancy;

wherein a second gathering cabin and an underwater acoustic communication machine are disposed in the main floating body, the second gathering cabin is used for monitoring a periodic instruction sent by a first gathering cabin, and when the periodic instruction can be received, the second gathering cabin is in a slave state; and when the periodic instruction cannot be received, the second gathering cabin is in a master state, the data of the sensors collected by the vertical mooring system at different water depths is obtained through a data bus of the main cable, the data is converted into a format required for the underwater acoustic communication machine, and the data in the format is sent by the underwater acoustic communication machine to the junction box of the seafloor observation network.

2. The seafloor observation network-based subsurface buoy device with real-time power supplying and high-speed data transmitting according to claim 1, wherein a first gathering cabin is disposed in the seabed base, the first gathering cabin is connected to a connection port of the junction box of the seafloor observation network by a wet pluggable connector, and the first gathering cabin comprises a power adapter and a protocol adapter, wherein the power adapter is used for converting high-voltage power transmitted by the junction box of the seafloor observation network into medium-voltage power and sending the medium-voltage power to a power cable of the main cable of the vertical mooring system; and the protocol adapter is used for converting the management and control command sent by the junction box of the seafloor observation network into a protocol format and sending the command in the protocol format to a data bus of the main cable, and is further used for gathering the data of the sensors collected by the vertical mooring system at different water depths, converting the data into a communication protocol format suitable for the junction box of the seafloor observation network, and sending the data in the communication protocol format to the junction box of the seafloor observation network, wherein a format of the data bus comprises, but not limited to, a CAN field bus and an RS485 field bus.

3. The seafloor observation network-based subsurface buoy device with real-time power supplying and high-speed data transmitting according to claim 1, wherein the positioning beacon is used for emitting positioning information when the subsurface buoy device rises to the sea surface, which is convenient for salvaging.

4. The seafloor observation network-based subsurface buoy device with real-time power supplying and high-speed data transmitting according to claim 1, wherein an access cabin, a relay cabin, and a sensor are disposed in the vertical mooring system, wherein one or more access cabins are provided, are fastened to the force bearing rope by a clamp, are separately connected to the first gathering cabin and the second gathering cabin by the main cable, and are connected to the sensor by an access cable; and the relay cabin is used for enhancing a transmitted signal; and the relay cabin is located between two access cabins, or between the access cabin and the first gathering cabin, or between the access cabin and the second gathering cabin, and an upper end and a lower end of the relay cabin are both connected to the main cable, and are fastened to the force bearing rope by the clamp.

5. The seafloor observation network-based subsurface buoy device with real-time power supplying and high-speed data transmitting according to claim 4, wherein the access cabin comprises a power adapter and a protocol adapter, wherein the power adapter is used for converting medium-voltage power of a power cable of the main cable into low-voltage power to supply power to the sensor; and the protocol adapter is used for converting the management and control command from a communication protocol format on the data bus of the main cable into a communication protocol format suitable for the sensor, and is further used for converting data collected by the sensor into a protocol format required for the data bus of the main cable, and sending the data in the protocol format to the data bus of the main cable.

6. The seafloor observation network-based subsurface buoy device with real-time power supplying and high-speed data transmitting according to claim 4, wherein the relay cabin comprises a power adapter and a signal regenerator, wherein the power adapter is used for converting medium-voltage power of a power cable of the main cable into low-voltage power to supply power to the signal regenerator; and the signal regenerator is used for performing signal enhancement on bidirectional data of the data bus of the main cable.

7. The seafloor observation network-based subsurface buoy device with real-time power supplying and high-speed data transmitting according to claim 4, wherein a floating block is wrapped outside the access cabin, the relay cabin, and the sensor, and used for adjusting a weight in water of the vertical mooring system to zero.

8. The seafloor observation network-based subsurface buoy device with real-time power supplying and high-speed data transmitting according to claim 4, wherein the length of the main cable is greater than that of the force bearing rope, and the main cable is fastened to the force bearing rope by a cable clamp, to keep the main cable from damage caused by a force and at the same time keep the main cable and the force bearing rope from being twisted to each other.

* * * * *